United States Patent
Wang et al.

(10) Patent No.: US 11,312,844 B2
(45) Date of Patent: Apr. 26, 2022

(54) COMPOSITIONS SUITABLE FOR MANUFACTURING POLYETHYLENE FOAM, AND ARTICLES THEREOF

(71) Applicant: Dow Global Technologies LLC, Midland, MI (US)

(72) Inventors: Jian Wang, Missouri City, TX (US); Jichang Feng, Shanghai (CN); Xiao Bing Yun, Shanghai (CN); Mehmet Demirors, Pearland, TX (US); Edward L. Lee, Singapore (SG); Hayley A. Brown, Houston, TX (US); Bin Li, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 47 days.

(21) Appl. No.: 16/304,893

(22) PCT Filed: Jul. 28, 2016

(86) PCT No.: PCT/CN2016/092009
§ 371 (c)(1),
(2) Date: Nov. 27, 2018

(87) PCT Pub. No.: WO2018/018484
PCT Pub. Date: Feb. 1, 2018

(65) Prior Publication Data
US 2020/0325313 A1    Oct. 15, 2020

(51) Int. Cl.
C08J 9/06 (2006.01)
C08L 23/06 (2006.01)
C08J 9/00 (2006.01)
C08L 23/08 (2006.01)

(52) U.S. Cl.
CPC .......... *C08L 23/06* (2013.01); *C08J 9/0061* (2013.01); *C08J 9/06* (2013.01); *C08L 23/0815* (2013.01); *C08J 2323/06* (2013.01); *C08J 2323/08* (2013.01); *C08L 2205/02* (2013.01); *C08L 2207/066* (2013.01)

(58) Field of Classification Search
CPC ...... C08L 23/06; C08L 23/0815; C08L 23/16; C08L 2203/14; C08L 2205/02; C08L 2207/066; C08J 2323/06; C08J 2423/08; C08J 9/0061; C08J 9/06; C08J 2323/08
See application file for complete search history.

(56) References Cited

U.S. PATENT DOCUMENTS

| | | |
|---|---|---|
| 3,563,870 A | 2/1971 | Tung et al. |
| 4,076,689 A | 2/1978 | Mills |
| 4,226,946 A | 10/1980 | Park et al. |
| 4,387,169 A | 6/1983 | Zabrocki et al. |
| 4,599,392 A | 7/1986 | McKinney et al. |
| 5,272,236 A | 12/1993 | Lai et al. |
| 5,278,272 A | 1/1994 | Lai et al. |
| 5,585,058 A | 12/1996 | Kolosowski |
| 5,844,045 A | 12/1998 | Kolthammer et al. |
| 6,096,793 A | 8/2000 | Lee et al. |
| 6,716,914 B2 | 4/2004 | Malwitz et al. |
| 6,809,125 B1 | 10/2004 | Lee et al. |
| 6,812,289 B2 | 11/2004 | Van Dun et al. |
| 7,173,069 B2 * | 2/2007 | Swennen ............... C08J 9/0061 521/134 |
| 2012/0046373 A1 | 2/2012 | Low et al. |
| 2015/0225526 A1 | 8/2015 | Tu et al. |
| 2015/0259445 A1 | 9/2015 | Kapur et al. |

FOREIGN PATENT DOCUMENTS

| | | | |
|---|---|---|---|
| WO | 1993/008221 A3 | 8/1993 | |
| WO | 2005/023912 A2 | 3/2005 | |
| WO | 2013/101930 A1 | 7/2013 | |
| WO | 2014/000230 A1 | 1/2014 | |
| WO | 2014/003926 A1 | 1/2014 | |
| WO | 2014/003927 A1 | 1/2014 | |
| WO | 2014/012250 A1 | 1/2014 | |
| WO | 2014/058656 A1 | 4/2014 | |
| WO | 2014/058659 A1 | 4/2014 | |
| WO | 2014/058660 A1 | 4/2014 | |
| WO | 2015/200741 A1 | 12/2015 | |
| WO | WO-2015200743 A1 * | 12/2015 | ............... C08J 5/18 |
| WO | 2016/014281 A1 | 1/2016 | |

OTHER PUBLICATIONS

Karjala, Annual Technical Conference—Society of Plastics Engineers, 2008, 66th, p. 887-891.
Williams, J. Polym. Sci., Polym. Let., 1968, vol. 6, p. 621-624.
PCT/CN2016/092009, International Search Report and Written Opinion dated Mar. 24, 2017.
PCT/CN2016/092009, International Preliminary Report on Patentability dated Feb. 7, 2019.

* cited by examiner

*Primary Examiner* — Irina S Zemel

(57) ABSTRACT

A composition suitable for making uncrosslinked polyethylene foam and an uncrosslinked polyethylene foam comprising: 50-95 wt. % of a low density polyethylene having a density ranging from 0.915 to 0.930 g/cc and melt index of 1-4 g/10 min; and 5-50 wt. % of an ethylene/alpha-olefin interpolymer having: a density ranging from 0.910-0.930 g/cc; a melt index ranging from 0.5 to 6.0 g/10 min; a Mw/Mn of from 2.8 to 4.5; and a ZSVR of 1.8 to 10.0.

2 Claims, No Drawings

COMPOSITIONS SUITABLE FOR MANUFACTURING POLYETHYLENE FOAM, AND ARTICLES THEREOF

TECHNICAL FIELD

Embodiments of the present disclosure generally relate to compositions suitable for manufacturing polyethylene foam, and specifically relate to compositions suitable for manufacturing uncrosslinked polyethylene foam, and articles thereof.

BACKGROUND

Polyethylene foam materials may be used as protective packaging for electronics, furniture, fruits, among other things. The polyethylene foam materials typically use low density polyethylene (LDPE) in these application as it has high melt strength necessary for foam cell wall stability. However, LDPE lacks in mechanical properties, such as compression strength and tear strength, when they are converted into foams, particularly where either heavier objects or an object that is shock sensitive requires protection. In those cases, a thicker and or heavier foam package would have to be used to provide enough protection of the object, which then translates to either higher material cost and/or shipping cost i.e. bulkier packages cost more to ship.

Accordingly, alternative compositions suitable for manufacturing polyethylene foam, which can provide suitable tear strength and/or compression strength, while also providing a similar level of object protection at a lower weight or a lower package volume, which may translate into material cost and/or shipping cost savings.

SUMMARY

Disclosed in embodiments herein are compositions suitable for making uncrosslinked polyethylene foam. The compositions comprise: 50-95 wt. % of a low density polyethylene having a density ranging from 0.915 to 0.930 g/cc and melt index of 1-4 g/10 min; and 5-50 wt. % of an ethylene/alpha-olefin interpolymer having: a density ranging from 0.910-0.930 g/cc; a melt index ranging from 0.5 to 6.0 g/10 min; a Mw/Mn of from 2.8 to 4.5; and a ZSVR of 1.8 to 10.0.

Also disclosed in embodiments herein are uncrosslinked polyethylene foams. The foams comprise: 50-95 wt. % of a low density polyethylene having a density ranging from 0.915 to 0.930 g/cc and melt index of 1-4 g/10 min; and 5-50 wt. % of an ethylene/alpha-olefin interpolymer having: a density ranging from 0.910-0.930 g/cc; a melt index ranging from 0.5 to 6.0 g/10 min; a Mw/Mn of from 2.8 to 4.5; and a ZSVR of 1.8 to 10.0.

Additional features and advantages of the embodiments will be set forth in the detailed description which follows, and in part will be readily apparent to those skilled in the art from that description or recognized by practicing the embodiments described herein. It is to be understood that both the foregoing and the following description describe various embodiments and are intended to provide an overview or framework for understanding the nature and character of the claimed subject matter.

DETAILED DESCRIPTION

Reference will now be made in detail to embodiments of compositions suitable for making uncrosslinked polyethylene foam, and uncrosslinked foams, characteristics of which are illustrated in the accompanying drawings. As used herein, "uncrosslinked" refers to no intentional usage or addition of a crosslinking agent throughout the foaming process. The compositions and/or foams may be used in protective packaging for electronics, furniture, fruits, glass items, toys, among other things, or with any other article where cushioning protection from shock and/or vibration is desired. It is noted, however, that this is merely an illustrative implementation of the embodiments disclosed herein. The embodiments may be applicable to other technologies that are susceptible to similar problems as those discussed above. For example, the compositions and/or foams described herein may be used in cushioned mats, cushioned floor pads, as a mattress component, etc., all of which are within the purview of the present embodiments.

The compositions suitable for manufacturing uncrosslinked polyethylene foam, and uncrosslinked polyethylene foams formed from a polyethylene composition, comprise: a low density polyethylene and an ethylene/alpha-olefin interpolymer. In embodiments described herein, the compositions comprise from 50-95 wt. % of the low density polyethylene and from 5-50 wt. % of the ethylene/alpha-olefin interpolymer. All individual values and subranges are included and disclosed herein. For example, the compositions may comprise from 60-95 wt. % or 75-95 wt. % of low density polyethylene and from 5-40 wt. % or 5-25 wt. % of ethylene/alpha-olefin interpolymer.

The composition may have an overall density ranging from 0.910 g/cc to 0.925 g/cc or 0.915 g/cc to 0.925 g/cc. In addition to the density, the composition may have an overall melt index ($I_2$) ranging from 0.5 to 6.0 g/10 min. All individual values and subranges are disclosed and included herein. For example, the composition may have an overall melt index ($I_2$) of from 0.5 to 5.0 g/10 minutes, 0.5 to 4.0 g/10 minutes, or 0.5 to 3.5 g/10 minutes.

Low Density Polyethylene (LDPE)

The low density polyethylene has a density of from 0.915 g/cc to 0.930 g/cc. The low density polyethylene also has a melt index, or I2, of from 1 g/10 min to 4 g/10 min. All individual values and subranges are included and disclosed herein. For example, in some embodiments, the low density polyethylene may have a density of from 0.917 g/cc to 0.930 g/cc, 0.917 g/cc to 0.927 g/cc, or 0.919 g/cc to 0.925 g/cc, and a melt index from 1 to 3.5 g/10 min or 1 to 3 g/10 min. In other embodiments, the low density polyethylene may have a density of from 0.920 g/cc to 0.930 g/cc, 0.922 g/cc to 0.930 g/cc, or 0.925 g/cc to 0.930 g/cc and a melt index from 1 to 3.5 g/10 min, 1 to 3 g/10 min, 1 g/10 min to 2.5 g/10 min, 1 g/10 min to 2 g/10 min, or 1 g/10 min to 1.5 g/10 min.

The LDPE may include branched polymers that are partly or entirely homopolymerized or copolymerized in autoclave and/or tubular reactors, or any combination thereof, using any type of reactor or reactor configuration known in the art, at pressures above 14,500 psi (100 MPa) with the use of free-radical initiators, such as peroxides (see for example U.S. Pat. No. 4,599,392, herein incorporated by reference). In some embodiments, the LDPE may be made in an autoclave process under single phase conditions designed to impart high levels of long chain branching, such as described in PCT patent publication WO 2005/023912, the disclosure of which is incorporated herein. Examples of suitable LDPEs may include, but are not limited to, ethylene homopolymers, and high pressure copolymers, including ethylene interpolymerized with, for example, vinyl acetate, ethyl acrylate, butyl acrylate, acrylic acid, methacrylic acid, carbon monoxide, or combinations thereof. The ethylene may also be interpolymerized with an alpha-olefin comonomer, for example, at least one C3-C20 alpha-olefin, such as propylene, isobutylene, 1-butene, 1-pentene, 1-hexene, and mixtures thereof. Exemplary LDPE resins may include, but is not limited to, resins sold by The Dow Chemical Company, such as, LDPE 320E resins, LDPE 352E resins, LDPE 450E resins, or LDPE 582E resins, resins sold by Westlake Chemical Corporation (Houston, Tex.), such as EF412, EF923, EF796, EF606, EF706, or EF413, resins sold by LyondellBasell Industries (Houston, Tex.), such as, MICROTHENE™ MN72200 or PETROTHENE™ M2520FN, NA143063, or NA149000, and resins sold by The ExxonMobil Chemical Company (Houston, Tex.) such as, LDPE LD 136.MN, LD 123.LM, LD 129.24, or LD 160AT. Other exemplary LDPE resins are described in WO 2014/051682 and WO 2011/019563, which are herein incorporated by reference.

Ethylene/Alpha-Olefin Interpolymer

"Interpolymer" refers to a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers. Ethylene/alpha-olefin interpolymer generally refers to polymers comprising ethylene and one or more alpha-olefins having 3 or more carbon atoms. In embodiments herein, the ethylene/alpha-olefin interpolymer comprises greater than 50 wt. % of the units derived from ethylene and less than 30 wt. % of the units derived from one or more alpha-olefin comonomers (based on the total amount of polymerizable monomers). All individual values and subranges of greater than 50 wt. % of the units derived from ethylene and less than 30 wt. % of the units derived from one or more alpha-olefin comonomers are included and disclosed herein. For example, the ethylene/alpha-olefin polymer may comprise (a) greater than or equal to 55%, for example, greater than or equal to 60%, greater than or equal to 65%, greater than or equal to 70%, greater than or equal to 75%, greater than or equal to 80%, greater than or equal to 85%, greater than or equal to 90%, greater than or equal to 92%, greater than or equal to 95%, greater than or equal to 97%, greater than or equal to 98%, greater than or equal to 99%, greater than or equal to 99.5%, from greater than 50% to 99%, from greater than 50% to 97%, from greater than 50% to 94%, from greater than 50% to 90%, from 70% to 99.5%, from 70% to 99%, from 70% to 97% from 70% to 94%, from 80% to 99.5%, from 80% to 99%, from 80% to 97%, from 80% to 94%, from 80% to 90%, from 85% to 99.5%, from 85% to 99%, from 85% to 97%, from 88% to 99.9%, 88% to 99.7%, from 88% to 99.5%, from 88% to 99%, from 88% to 98%, from 88% to 97%, from 88% to 95%, from 88% to 94%, from 90% to 99.9%, from 90% to 99.5% from 90% to 99%, from 90% to 97%, from 90% to 95%, from 93% to 99.9%, from 93% to 99.5% from 93% to 99%, or from 93% to 97%, by weight, of the units derived from ethylene; and (b) less than 30 percent, for example, less than 25 percent, or less than 20 percent, less than 18%, less than 15%, less than 12%, less than 10%, less than 8%, less than 5%, less than 4%, less than 3%, less than 2%, less than 1%, from 0.1 to 20%, from 0.1 to 15%, 0.1 to 12%, 0.1 to 10%, 0.1 to 8%, 0.1 to 5%, 0.1 to 3%, 0.1 to 2%, 0.5 to 12%, 0.5 to 10%, 0.5 to 8%, 0.5 to 5%, 0.5 to 3%, 0.5 to 2.5%, 1 to 10%, 1 to 8%, 1 to 5%, 1 to 3%, 2 to 10%, 2 to 8%, 2 to 5%, 3.5 to 12%, 3.5 to 10%, 3.5 to 8%, 3.5% to 7%, or 4 to 12%, 4 to 10%, 4 to 8%, or 4 to 7%, by weight, of units derived from one or more a-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

Suitable alpha-olefin comonomers typically have no more than 20 carbon atoms. The one or more alpha-olefins may be selected from the group consisting of C3-C20 acetylenically unsaturated monomers and C4-C18 diolefins. For example, the alpha-olefin comonomers may have 3 to 10 carbon atoms, or 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. The one or more alpha-olefin comonomers may, for example, be selected from the group consisting of propylene, 1-butene, 1-hexene, and 1-octene; or in the alternative, from the group consisting of 1-butene, 1-hexene and 1-octene, or in the alternative, from the group consisting of 1-hexene and 1-octene. In some embodiments, the ethylene/alpha-olefin interpolymer comprises greater than 0 wt. % and less than 30 wt. % of units derived from one or more of 1-octene, 1-hexene, or 1-butene comonomers.

Any conventional ethylene (co)polymerization reaction processes may be employed to produce the ethylene/alpha-olefin interpolymer composition. Such conventional ethylene (co)polymerization reaction processes include, but are not limited to, gas phase polymerization process, slurry phase polymerization process, solution phase polymerization process, and combinations thereof using one or more conventional reactors, e.g. fluidized bed gas phase reactors, loop reactors, stirred tank reactors, batch reactors in parallel, series, and/or any combinations thereof. Additional ethylene (co)polymerization reaction processes may be found in U.S. Pat. Nos. 5,272,236, 5,278,272, 6,812,289, and WO 93/08221, all of which are incorporated herein by reference.

In some embodiments, the ethylene/alpha-olefin interpolymer may comprise a homogeneously branched ethylene/alpha-olefin copolymer component and a heterogeneously branched ethylene/alpha-olefin copolymer component. The homogeneously branched ethylene/alpha-olefin copolymer component may be a random homogeneously branched linear ethylene/α-olefin copolymer component or a random homogeneously branched substantially linear ethylene/α-olefin copolymer component. The term "substantially linear ethylene/α-olefin copolymer" means that the polymer backbone is substituted with from 0.01 long chain branches/1000 carbons to 3 long chain branches/1000 carbons, or from 0.01 long chain branches/1000 carbons to 1 long chain branches/1000 carbons, or from 0.05 long chain branches/1000 carbons to 1 long chain branches/1000 carbons. In contrast, the term "linear ethylene/α-olefin copolymer" means that the polymer backbone has no long chain branching. The homogeneously branched ethylene/α-olefin copolymer component may be produced, for example, using metallocene catalysts. This includes homogeneous-branched, substantially linear ethylene polymers ("SLEP") which are prepared using constrained geometry catalysts ("CGC Catalyst"), such as disclosed in U.S. Pat. Nos. 5,272,236, 5,278,272, 6,812,289, and WO 93/08221, which are incorporated herein by reference, as well as the homogeneous linear ethylene polymers ("LEP") which are prepared using other metallocene (called "bis-CP catalysts"). Other catalyst systems that may be used to form the homogeneously branched ethylene/α-olefin copolymer include those comprising a metal complex of a polyvalent aryloxyether, which is further described in U.S. Pat. No. 8,450,438, and is incorporated herein by reference.

The heterogeneously branched ethylene/α-olefin copolymer component differs from the homogeneously branched ethylene/α-olefin copolymer component primarily in their branching distribution. For example, the heterogeneously branched ethylene/α-olefin copolymer component has a distribution of branching that includes a highly branched portion (similar to a very low density polyethylene), a medium branched portion (similar to a medium branched polyethylene) and an essentially linear portion (similar to linear homopolymer polyethylene). The heterogeneously branched ethylene/α-olefin copolymer component can be prepared via the polymerization of ethylene and one or more α-olefin comonomers in the presence of a Ziegler Natta catalyst as disclosed in U.S. Pat. Nos. 4,076,698 and 5,844,045, which are incorporated by reference herein in their entirety. For example and not by way of limitation, these Ziegler-Natta catalysts may include Group 4 metal halides supported on Group 2 metal halides or mixed halides and alkoxides and chromium or vanadium-based catalysts. In specific embodiments, the Ziegler-Natta catalyst composition may be a multi-constituent catalyst system including a magnesium and titanium containing procatalyst and a cocatalyst. The procatalyst may, for example, may comprise the reaction product of magnesium dichloride, an alkylaluminum dihalide, and a titanium alkoxide.

In embodiments herein, the ethylene/alpha-olefin interpolymer has a density ranging from 0.910 g/cc to 0.930 g/cc. All individual values and subranges are disclosed and included herein. For example, the ethylene/alpha-olefin interpolymer may have a density ranging from 0.910 g/cc to 0.925 g/cc or 0.915 g/cc to 0.925 g/cc. In addition to the density, the ethylene/alpha-olefin interpolymer has a melt index ($I_2$) may range from 0.5 to 6.0 g/10 min. All individual values and subranges are disclosed and included herein. For example, the ethylene/alpha-olefin interpolymer may have a melt index ($I_2$) of from 0.5 to 3.0 g/10 minutes, 0.5 to 2.0 g/10 minutes, or 0.5 to 1.4 g/10 minutes.

In addition to density and melt index, the ethylene/alpha-olefin interpolymer has an Mw/Mn of from 2.8 to 4.5, where Mw is the weight average molecular weight and Mn is the number average molecular weight. All individual values and subranges are disclosed and included herein. For example, the ethylene/alpha-olefin interpolymer may have an Mw/Mn of from 3.0 to 4.5 or 3.0 to 4.0.

In addition to density, melt index, and Mw/Mn, the ethylene/alpha-olefin interpolymer has a zero shear viscosity ratio (ZSVR) of 1.8 to 10.0. All individual values and subranges are included and disclosed herein. For example, the ethylene/alpha-olefin interpolymer composition may have a ZSVR that can be from 1.8 to 8.0, 1.8 to 6.5, or 2.0 to 5.0.

In addition to density, melt index, Mw/Mn, and ZSVR, the ethylene/alpha-olefin interpolymer may further be characterized by molecular weighted comonomer distribution index (MWCDI) of greater than −0.5 to 0.9. All individual values and subranges are included and disclosed herein. For example, the ethylene/alpha-olefin interpolymer composition may have a MWCDI that can be from −0.25 to 0.8 or 0 to 0.75.

Uncrosslinked Polyethylene Foam

As noted above, the uncrosslinked polyethylene foam is formed from the polyethylene compositions described above. The foam density of the uncrosslinked polyethylene foam ranges from 10-70 kg/m³. Minor amounts of other materials may also advantageously be used in the polyethylene compositions and/or the uncrosslinked polyethylene foams described herein. These include other polymers to provide added melt strength, foamability, stiffness (e.g., polypropylene), and pigments to provide coloring. These additional polymers should be present in an amount of 15 wt. % or less. In some embodiments, these additional polymers are present in amounts of 12.5 wt. % or less, 10 wt. % or less, 7.5 wt. % or less, or 5 wt. % or less. Process aids could also be added to help reduce shear heating, particularly when using lower MI blends. Other additives such as UV stabilizers, chemical blowing agent, anti-static or fire retardants may be necessary to provide required functionality for specific applications, as is generally known in the art. The process aids and other additives should not be added in an amount greater than 2 percent (for example, less than 1.0 percent, less than 0.5 percent, or less than 0.1 percent) depending on the additive.

The uncrosslinked polyethylene foam may be formed using a typical production line having a tandem extruder line set-up. All components, including the polymer base resin, nucleating agent, permeation agent, and/or blowing agent are mixed in a primary extruder to form a mixture. The mixture is transferred and cooled in a second extruder close to the crystallization temperature of the base resin. After release of the pressure in die lip, the blowing agent will expand at the nucleating agent center to form a cell. The die pressure and die gap can be varied to achieve different foam bubble structure and size. Extruder temperature may also be adjusted in order to activate the chemical blowing agent. It should be readily appreciated by one skilled in the art that the blend components and fabrication conditions (e.g., pressure and melt temperature in the extruders) can be chosen to optimize the chance of successfully making a foamed sheet as described herein. After the foam sheet was pulled out the die lip, typically it will need to be aged under ambient temperature for several days to sufficiently exchange the internal blowing agent with external air.

Test Methods

Melt Index

Melt index (I2), for ethylene-based polymers, is measured in accordance with ASTM D 1238-10, Condition, 190° C./2.16 kg, and is reported in grams eluted per 10 minutes.

Density

Density is measured in accordance with ASTM D792.

High Temperature Gel Permeation Chromatography (HT-GPC)

A PolymerChar (Valencia, Spain) high temperature Gel Permeation Chromatography system consisting of an infrared concentration detector (IR-5) was used for MW and MWD determination. The solvent delivery pump, the on-line solvent degas device, auto-sampler, and column oven were from Agilent. The column compartment and detector compartment were operated at 150° C. The columns were three PLgel 10 μm Mixed-B, columns (Agilent). The carrier solvent was 1,2,4-trichlorobenzene (TCB) with a flow rate of 1.0 mL/min. Both solvent sources for chromatographic and sample preparation contained 250 ppm of butylated hydroxytoluene (BHT) and were nitrogen sparged. Polyethylene samples were prepared at targeted polymer concentrations of 2 mg/mL by dissolving in TCB at 160° C. for 3 hour on the auto-sampler just prior the injection. The injection volume was 200 μL.

Calibration of the GPC column set was performed with 21 narrow molecular weight distribution polystyrene standards. The molecular weights of the standards ranged from 580 to 8,400,000 g/mol, and were arranged in 6 "cocktail" mixtures, with at least a decade of separation between individual molecular weights. The polystyrene standard peak molecular weights were converted to polyethylene molecular weights using the following equation (as described in Williams and Ward, J. Polym. Sci., Polym. Let., 6, 621 (1968)):

$$M_{polyethylene} = A(M_{polystyrene})^B \quad (1)$$

Here B has a value of 1.0, and the experimentally determined value of A is around 0.42.

A third order polynomial was used to fit the respective polyethylene-equivalent calibration points obtained from equation (1) to their observed elution volumes. The actual polynomial fit was obtained so as to relate the logarithm of polyethylene equivalent molecular weights to the observed elution volumes (and associated powers) for each polystyrene standard.

Number-, weight- and z-average molecular weights are calculated according to the following equations:

$$\overline{Mn} = \frac{\sum_i Wf_i}{\sum_i (Wf_i/M_i)} \quad (2)$$

$$\overline{Mw} = \frac{\sum_i (Wf_i * M_i)}{\sum_i Wf_i} \quad (3)$$

$$\overline{Mz} = \frac{\sum_i (Wf_i * M_i^2)}{\sum_i (Wf_i * M_i)} \quad (4)$$

Where, $Wf_i$ is the weight fraction of the i-th component and $M_i$ is the molecular weight of the i-th component. The MWD is expressed as the ratio of the weight average molecular weight (Mw) to the number average molecular weight (Mn).

The accurate A value was determined by adjusting A value in equation (1) until Mw, the weight average molecular weight calculated using equation (3) and the corresponding retention volume polynomial, agreed with the independently determined value of Mw obtained in accordance with the linear homopolymer reference with known weight average molecular weight of 120,000 g/mol.

Creep Zero Shear Viscosity Measurement Method

Zero-shear viscosities are obtained via creep tests that were conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 μm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ $s^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of c vs. t, where c is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-Shear Viscosity Ratio (ZSVR) is defined as the ratio of the zero-shear viscosity (ZSV) of the branched polyethylene material to the ZSV of the linear polyethylene material at the equivalent weight average molecular weight (Mw-gpc) according to the following Equation:

$$ZSVR = \frac{\eta_{0B}}{\eta_{0L}} = \frac{\eta_{0B}}{2.29^{-15} M_{w-gpc}^{3.65}}$$

The ZSV value is obtained from creep test at 190° C. via the method described above. The Mw-gpc value is determined by the HT-GPC method. The correlation between ZSV of linear polyethylene and its Mw-gpc was established based on a series of linear polyethylene reference materials. A description for the ZSV-Mw relationship can be found in the ANTEC proceeding: Karjala, Teresa P.; Sammler, Robert L.; Mangnus, Marc A.; Hazlitt, Lonnie G.; Johnson, Mark S.; Hagen, Charles M., Jr.; Huang, Joe W. L.; Reichek, Kenneth N. Detection of low levels of long-chain branching in polyolefins. Annual Technical Conference—Society of Plastics Engineers (2008), 66th 887-891.

Molecular Weighted Comonomer Distribution Index (MWCDI)

A GPC-IR, high temperature chromatographic system from PolymerChar (Valencia, Spain) was equipped with a Precision Detectors' (Amherst, Mass.) 2-angle laser light scattering detector Model 2040, and an IR5 infra-red detector (GPC-IR) and a 4-capillary viscometer, both from PolymerChar. The "15-degree angle" of the light scattering detector was used for calculation purposes. Data collection was performed using PolymerChar Instrument Control software and data collection interface. The system was equipped with an on-line, solvent degas device and pumping system from Agilent Technologies (Santa Clara, Calif.).

Injection temperature was controlled at 150 degrees Celsius. The columns used, were four, 20-micron "Mixed-A" light scattering columns from Polymer Laboratories (Shropshire, UK). The solvent was 1,2,4-trichlorobenzene. The samples were prepared at a concentration of "0.1 grams of polymer in 50 milliliters of solvent." The chromatographic solvent and the sample preparation solvent each contained "200 ppm of butylated hydroxytoluene (BHT)." Both solvent sources were nitrogen sparged. Ethylene-based polymer samples were stirred gently, at 160 degrees Celsius, for three hours. The injection volume was "200 microliters," and the flow rate was "1 milliliters/minute."

Calibration of the GPC column set was performed with 21 "narrow molecular weight distribution" polystyrene standards, with molecular weights ranging from 580 to 8,400, 000 g/mole. These standards were arranged in six "cocktail" mixtures, with at least a decade of separation between individual molecular weights. The standards were purchased from Polymer Laboratories (Shropshire UK). The polystyrene standards were prepared at "0.025 grams in 50 milliliters of solvent" for molecular weights equal to, or greater than, 1,000,000 g/mole, and at "0.050 grams in 50 milliliters of solvent" for molecular weights less than 1,000,000 g/mole. The polystyrene standards were dissolved at 80 degrees Celsius, with gentle agitation, for 30 minutes. The narrow standards mixtures were run first, and in order of decreasing "highest molecular weight component," to minimize degradation. The polystyrene standard peak molecular weights were converted to polyethylene molecular weights using Equation 1B (as described in Williams and Ward, J. Polym. Sci., Polym. Let., 6, 621 (1968)):

$$M \text{polyethylene} = A \times (M \text{polystyrene})^B \quad \text{(Eqn. 1B)},$$

where M is the molecular weight, A has a value of approximately 0.40 and B is equal to 1.0. The A value was adjusted between 0.385 and 0.425 (depending upon specific column-set efficiency), such that NBS 1475A (NIST) linear polyethylene weight-average molecular weight corresponded to 52,000 g/mole, as calculated by Equation 3B, below:

$$Mn(LALS\ gpc) = \frac{\sum_{i=RV_{integration\ start}}^{i=RV_{integration\ end}}(IR_{measurement\ channel_i})}{\sum_{i=RV_{integration\ start}}^{i=RV_{integration\ end}}(IR_{measurement\ channel_i}/M_{PE_i})} \quad \text{(Eqn. 2B)}$$

$$Mw(LALS\ gpc) = \frac{\sum_{i=RV_{integration\ start}}^{i=RV_{integration\ end}}(M_{PE_i}\ IR_{measurement\ channel_i})}{\sum_{i=RV_{integration\ start}}^{i=RV_{integration\ end}}(IR_{measurement\ channel_i})} \quad \text{(Eqn. 3B)}$$

In Equations 2B and 3B, RV is column retention volume (linearly-spaced), collected at "1 point per second." The IR is the baseline-subtracted IR detector signal, in Volts, from the measurement channel of the GPC instrument, and the $M_{PE}$ is the polyethylene-equivalent MW determined from Equation 1B. Data calculation were performed using "GPC One software (version 2.013H)" from PolymerChar.

A calibration for the IR5 detector ratios was performed using at least ten ethylene-based polymer standards (polyethylene homopolymer and ethylene/octene copolymers; narrow molecular weight distribution and homogeneous comonomer distribution) of known short chain branching (SCB) frequency (measured by the $^{13}C$ NMR Method, as discussed above), ranging from homopolymer (0 SCB/1000 total C) to approximately 50 SCB/1000 total C, where total C=carbons in backbone+carbons in branches. Each standard had a weight-average molecular weight from 36,000 g/mole to 126,000 g/mole, as determined by the GPC-LALS processing method described above. Each standard had a molecular weight distribution (Mw/Mn) from 2.0 to 2.5, as determined by the GPC-LALS processing method described above. Polymer properties for the SCB standards are shown in Table A.

TABLE A

"SCB" Standards

| Wt % Comonomer | IR5 Area ratio | SCB/ 1000 Total C | Mw | Mw/Mn |
|---|---|---|---|---|
| 23.1 | 0.2411 | 28.9 | 37,300 | 2.22 |
| 14.0 | 0.2152 | 17.5 | 36,000 | 2.19 |
| 0.0 | 0.1809 | 0.0 | 38,400 | 2.20 |
| 35.9 | 0.2708 | 44.9 | 42,200 | 2.18 |
| 5.4 | 0.1959 | 6.8 | 37,400 | 2.16 |
| 8.6 | 0.2043 | 10.8 | 36,800 | 2.20 |
| 39.2 | 0.2770 | 49.0 | 125,600 | 2.22 |
| 1.1 | 0.1810 | 1.4 | 107,000 | 2.09 |
| 14.3 | 0.2161 | 17.9 | 103,600 | 2.20 |
| 9.4 | 0.2031 | 11.8 | 103,200 | 2.26 |

The "IR5 Area Ratio (or "$IR5_{Methyl\ Channel\ Area}/IR5_{Measurement\ Channel\ Area}$")" of "the baseline-subtracted area response of the IR5 methyl channel sensor" to "the baseline-subtracted area response of IR5 measurement channel sensor" (standard filters and filter wheel as supplied by PolymerChar: Part Number IR5_FWM01 included as part of the GPC-IR instrument) was calculated for each of the "SCB" standards. A linear fit of the SCB frequency versus the "IR5 Area Ratio" was constructed in the form of the following Equation 4B:

$$SCB/1000\text{total}C = A_0 + [A_1 \times (IR5_{Methyl\ Channel\ Area}/IR5_{Measurement\ Channel\ Area})] \quad \text{(Eqn. 4B)},$$

here $A_0$ is the "SCB/1000 total C" intercept at an "IR5 Area Ratio" of zero, and $A_1$ is the slope of the "SCB/ 1000 total C" versus "IR5 Area Ratio" and represents the increase in the "SCB/1000 total C" as a function of "IR5 Area Ratio."

A series of "linear baseline-subtracted chromatographic heights" for the chromatogram generated by the "IR5 methyl channel sensor" was established as a function of column elution volume, to generate a baseline-corrected chromatogram (methyl channel). A series of "linear baseline-subtracted chromatographic heights" for the chromatogram generated by the "IR5 measurement channel" was established as a function of column elution volume, to generate a base-line-corrected chromatogram (measurement channel).

The "IR5 Height Ratio" of "the baseline-corrected chromatogram (methyl channel)" to "the baseline-corrected chromatogram (measurement channel)" was calculated at each column elution volume index (each equally-spaced index, representing 1 data point per second at 1 ml/min elution) across the sample integration bounds. The "IR5 Height Ratio" was multiplied by the coefficient $A_1$, and the coefficient $A_0$ was added to this result, to produce the predicted SCB frequency of the sample. The result was converted into mole percent comonomer, as follows in Equation 5B:

$$\text{Mole Percent Comonomer} = \{SCB_f/[SCB_f + ((1000 - SCB_f*\text{Length of comonomer})/2)]\}*100 \quad \text{(Eqn. 5B)},$$

where "$SCB_f$" is the "SCB per 1000 total C" and the "Length of comonomer"=8 for octene, 6 for hexene, and so forth.

Each elution volume index was converted to a molecular weight value ($Mw_i$) using the method of Williams and Ward (described above; Eqn. 1B). The "Mole Percent Comonomer (y axis)" was plotted as a function of Log($Mw_i$), and the slope was calculated between $Mw_i$ of 15,000 and $Mw_i$ of 150,000 g/mole (end group corrections on chain ends were omitted for this calculation). An EXCEL linear regression was used to calculate the slope between, and including, $Mw_i$ from 15,000 to 150,000 g/mole. This slope is defined as the molecular weighted comonomer distribution index (MWCDI=Molecular Weighted Comonomer Distribution Index).

Compressive Strength

According to ASTM D3757, the test specimen shall be 50.8 by 50.8 by 25.4 mm with parallel top and bottom surfaces. The thickness shall be no greater than 75% of the minimum top dimension. Place the specimen centered in the line of the axial load on the supporting plate of the apparatus. Bring the compression foot into contact with the specimen and determine the thickness after applying a total pretest-pressure of 190±50 Pa to the specimen area. Compress the specimen 25±0.5%, 30±5%, or 50±5% of this thickness at 12.7 mm/min and take the reading of the load immediately, unless another speed is specified. Calculate the 25%, 30% or 50% compression deflection force, per unit area of specimen, expressed as kilopascals.

Tear Strength/Elongation

According to ASTM D3757, the test specimen should be cut using Die C. Test the material at the thickness to be supplied. Place the test piece in the grips of the testing machine using care to adjust the test piece so that it will be strained uniformly along its length, and that sufficient material is clamped in the grips to minimize slippage. Start the machine at a 500±50 mm/min rate of grip separation. Strain the test piece until it is completely ruptured. Record the maximum force and the percent elongation at rupture. Calculate the tear strength in newtons per meter of thickness.

Tensile Strength

According to ASTM D3757, the test specimen should be cut using Die A. Place the dumbbell or straight specimen in the grips of the testing machine, using care to adjust the specimen symmetrically to distribute tension uniformly over the cross section. Unless otherwise specified, the rate of grip separation shall be 500±50 mm/min. Start the machine and note the distance between the bench marks, taking care to avoid parallax. Record the force at the elongation specified for the test and at the time of rupture. Calculate the tensile strength in kilopascals.

EXAMPLES

TABLE 1

Resin Descriptions

| | | Density (g/cm$^3$) | Melt Index, I2 (g/10 min) |
|---|---|---|---|
| LDPE | Low density polyethylene available as LDPE 450E from The Dow Chemical Company (Midland, MI) | 0.923 | 2.0 |
| Interpolymer 1 | Ethylene/alpha-olefin interpolymer, available as ELITE ™ 5400G from The Dow Chemical Company (Midland, MI) | 0.916 | 1.0 |
| Interpolymer 2 | Ethylene/alpha-olefin interpolymer, available as ELITE ™ 5100G from The Dow Chemical Company (Midland, MI) | 0.920 | 0.85 |

TABLE 1-continued

Resin Descriptions

| | | Density (g/cm$^3$) | Melt Index, I2 (g/10 min) |
|---|---|---|---|
| Interpolymer A | Ethylene/alpha-olefin interpolymer, available as DOWLEX ™ 2047G from The Dow Chemical Company (Midland, MI) | 0.917 | 2.3 |

TABLE 2

Ethylene/Alpha-Olefin Characterization Data

| Test | Units | Interpolymer A | Interpolymer 1 | Interpolymer 2 |
|---|---|---|---|---|
| Eta* @ 0.1 rad/s (190° C.) | Pa · s | 3375 | 10155 | 11979 |
| Eta* @ 1 rad/s (190° C.) | Pa · s | 2996 | 6956 | 7796 |
| Eta* @ 10 rad/s (190° C.) | Pa · s | 2128 | 3982 | 4317 |
| Eta* @ 100 rad/s (190° C.) | Pa · s | 1024 | 1582 | 1697 |
| Eta* 0.1/Eta* 100 | | 3.3 | 6.4 | 7.1 |
| Mw | g/mol | 92,737 | 106,525 | 110,060 |
| Mn | g/mol | 24,253 | 27,744 | 31,333 |
| Mw/Mn | | 3.82 | 3.84 | 3.51 |
| ZSVR | | 1.2 | 2.55 | 2.85 |
| MWCDI | | −1.41 | 0.62 | 0.53 |

TABLE 3

Blend Formulations

| | LDPE | Interpolymer A | Interpolymer 1 | Interpolymer 2 |
|---|---|---|---|---|
| Blend A (B-A) | 100 wt. % | | | |
| Blend B (B-B) | 80 wt. % | 20 wt. % | | |
| Blend 1 (B-1) | 80 wt. % | | 20 wt. % | |
| Blend 2 (B-2) | 80 wt. % | | | 20 wt. % |
| Blend 3 (B-3) | 90 wt. % | | 10 wt. % | |
| Blend 4 (B-4) | 85 wt. % | | | 15 wt. % |

TABLE 4

| | | Blend Characterization Data | | | | | |
|---|---|---|---|---|---|---|---|
| Test | Units | B-A | B-B | B-1 | B-2 | B-3 | B-4 |
| Density | g/cc | 0.924 | 0.920 | 0.923 | 0.923 | 0.923 | 0.924 |
| Melt Index (I2) | g/10 min | 2.1 | 2.1 | 1.3 | 1.3 | 1.6 | 1.4 |
| Eta* @ 0.1 rad/s (190° C.) | Pa·s | 7321 | | 10088 | 10088 | 9102 | 10765 |
| Eta* @ 1 rad/s (190° C.) | Pa·s | 4240 | | 5710 | 5710 | 5107 | 5901 |
| Eta* @ 10 rad/s (190° C.) | Pa·s | 1646 | | 2289 | 2289 | 1975 | 2290 |
| Eta* @ 100 rad/s (190° C.) | Pa·s | 486 | | 711 | 711 | 592 | 692 |
| Eta* 0.1/ Eta* 100 | | 15.1 | | 14.2 | 14.2 | 15.4 | 15.6 |
| Melt Strength | cN | 7.6 | | 10.2 | 10.2 | 9.5 | 10.2 |

The blends were made into foam sheets. The uncrosslinked polyethylene foam was formed using a typical production line having a tandem line set-up. All components, including the polymer blends, nucleating agent, permeation agent, and/or blowing agent are mixed in a primary extruder to form a mixture. The mixture is transferred and cooled in a second extruder close to the crystallization temperature of the polymer blend. After release of the pressure in die lip, the blowing agent will expand at the nucleating agent center to form a cell. Foam A was made from Blend A, Foam B from Blend B, Foam 1 from Blend 1, Foam 2 from Blend 2, Foam 3 from Blend 3, and Foam 4 from Blend 4.

TABLE 5

| | | Foam Performance Data | | | | | |
|---|---|---|---|---|---|---|---|
| Test | Units | Foam A | Foam B | Foam 1 | Foam 2 | Foam 3 | Foam 4 |
| Foam Density | kg/m³ | 28.9 | 26.7 | 26.7 | 24.1 | 24.3 | 27.5 |
| Tear Strength, TD | N/mm | 1.08 | 1.09 | 1.53 | 2.63 | 1.95 | 1.83 |
| Tear Strength, MD | N/mm | 1.63 | 1.75 | 1.93 | 2.85 | 2.22 | 2.19 |
| Tensile Strength, TD | kPa | 190 | 210 | 218 | 240 | 220 | 220 |
| Tensile Strength, MD | kPa | 252 | 286 | 304 | 270 | 260 | 270 |
| Elongation, TD | % | 56 | 86 | 123 | 148 | 120 | 106 |
| Elongation, MD | % | 112 | 127 | 167 | 161 | 138 | 133 |
| 25% Compression Strength | kPa | 24 | 23 | 23 | 32 | 29 | 37 |
| 50% Compression Strength | kPa | 71 | 60 | 60 | 75 | 64 | 87 |

As shown in Table 5, foams 1 and 2 performed the best from both foaming and mechanical properties. Foam B was similar to foam 1, but mechanical strength was not improved.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. An uncrosslinked polyethylene foam formed from a polyethylene composition, the composition comprising:
   75-95 wt. % of a low density polyethylene having a density ranging from 0.915 to 0.930 g/cc and melt index of 1-4 g/10 min; and 5-25 wt. % of an ethylene/alpha-olefin interpolymer having:
  a density ranging from 0.910-0.930 g/cc;
  a melt index ranging from 0.5 to 6.0 g/10 min;
  a Mw/Mn of from 2.8 to 4.5; and
  a ZSVR of 1.8 to 10.0;
wherein the foam density of the uncrosslinked polyethylene foam ranges from 10-70 kg/m$^3$; and
wherein the ethylene/alpha-olefin interpolymer has an MWCDI of from 0 to 0.75.

2. The foam of claim 1, wherein the melt index ranges from 0.5 to 3.0 g/10 min.

* * * * *